(12) United States Patent
Miyazawa et al.

(10) Patent No.: US 9,709,863 B2
(45) Date of Patent: Jul. 18, 2017

(54) LIQUID CRYSTAL DISPLAY DEVICE

(75) Inventors: Toshio Miyazawa, Chiba (JP);
Terunori Saitou, Mobara (JP); Tatsuya Sugita, Takahagi (JP); Miyuki Sugita, legal representative, Takahagi (JP);
Shinichiro Oka, Hitachi (JP)

(73) Assignee: Japan Display Inc., Tokyo (JP)

(*) Notice: Subject to any disclaimer, the term of this patent is extended or adjusted under 35 U.S.C. 154(b) by 761 days.

(21) Appl. No.: 13/437,982

(22) Filed: Apr. 3, 2012

(65) Prior Publication Data
US 2012/0257127 A1   Oct. 11, 2012

(30) Foreign Application Priority Data

Apr. 8, 2011   (JP) .................................. 2011-086293

(51) Int. Cl.
| | | |
|---|---|---|
| G02F 1/1335 | (2006.01) | |
| G02F 1/1347 | (2006.01) | |
| H04N 13/04 | (2006.01) | |
| G02F 1/1343 | (2006.01) | |
| G02F 1/29 | (2006.01) | |

(52) U.S. Cl.
CPC ..... G02F 1/13471 (2013.01); H04N 13/0404 (2013.01); H04N 13/0454 (2013.01); *G02F 2001/134381* (2013.01); *G02F 2001/294* (2013.01)

(58) Field of Classification Search
CPC ............... G02F 1/1335; G02F 1/13471; G02F 2001/134381; G02F 2001/294; H04N 13/0454; H04N 13/0404

USPC .......................................................... 349/15
See application file for complete search history.

(56) References Cited

U.S. PATENT DOCUMENTS

| | | | |
|---|---|---|---|
| 5,493,427 A | 2/1996 | Nomura et al. | |
| 2008/0266387 A1 | 10/2008 | Krijn et al. | |
| 2008/0284844 A1* | 11/2008 | Woodgate .......... | G02B 27/2214 348/54 |
| 2010/0157181 A1* | 6/2010 | Takahashi .......... | G02B 27/2214 349/33 |
| 2010/0295930 A1* | 11/2010 | Ezhov .................... | G02B 27/26 348/58 |

(Continued)

FOREIGN PATENT DOCUMENTS

| | | |
|---|---|---|
| JP | 2862462 | 12/1998 |
| JP | 2009-520231 | 5/2009 |
| WO | WO 2004/070467 | 8/2004 |

*Primary Examiner* — Charles Chang
(74) *Attorney, Agent, or Firm* — Typha IP LLC

(57) ABSTRACT

In a liquid crystal display device, a first substrate adjacent to a liquid crystal display panel is subjected to rubbing in a first direction that is the same as a polarization axis direction of light emitted from the liquid crystal display panel, and a second substrate that interposes a liquid crystal layer with the first substrate is subjected to rubbing in a second direction at a right angle with the first direction. The second direction is made the same as the polarization axis direction of polarized sunglasses to allow visual recognition of the image using the polarized sunglasses. Electrode patterns formed by alternately providing narrow and wide electrodes are arranged on the upper and lower substrates in a direction at a right angle with each other so that the rubbing directions on the upper and lower substrates form a right angle to ensure stable 3D display.

7 Claims, 11 Drawing Sheets

Y-Y

(56) References Cited

U.S. PATENT DOCUMENTS

| | | | |
|---|---|---|---|
| 2011/0043715 A1* | 2/2011 | Ohyama | G02B 27/2214 349/15 |
| 2011/0292306 A1* | 12/2011 | Kim | G02B 27/2214 349/5 |
| 2012/0236219 A1* | 9/2012 | Kroll | G02F 1/134363 349/15 |

* cited by examiner

Y-Y

LIQUID CRYSTAL DISPLAY DEVICE

CLAIM OF PRIORITY

The present application claims priority from Japanese Patent Application JP 2011-086293 filed on Apr. 8, 2011, the content of which is hereby incorporated by reference into this application.

TECHNICAL FIELD

The present invention relates to a display device, and more particularly, to a liquid crystal display device which allows a three-dimensional display using a liquid crystal lens.

BACKGROUND OF THE INVENTION

A liquid crystal display panel includes a TFT substrate having pixel electrodes and thin film transistors (TFT) arranged in a matrix, and a counter substrate that is located opposite the TFT substrate, having color filters positioned corresponding to the pixel electrodes on the TFT substrate. A liquid crystal is interposed between the TFT substrate and the counter substrate to form a display region. An image is formed by controlling light transmittance through liquid crystal molecules for each pixel. Since the liquid crystal is capable of controlling only polarization light, a light ray from a backlight is polarized by a lower polarizer before incidence to the TFT substrate, and controlled by a liquid crystal layer. It is further polarized by an upper polarizer again so as to be emitted to the outside. Therefore the light emitted from the liquid crystal display panel becomes polarization light.

Various methods for forming a three-dimensional image on the liquid crystal display panel have been proposed. Among all of those methods, the one which provides the liquid crystal lens on the liquid crystal display panel has been focused on its application especially to a small-sized display device because of features that no special glasses are required for visual recognition of the three-dimensional image and that selection between the two-dimensional image and the three-dimensional image may be performed.

Japanese Patent No. 2862462 discloses the structure in which a liquid crystal lens has liquid crystal molecules interposed between an upper substrate and a lower substrate, upper substrate electrode patterns are formed in stripes on the upper substrate, and flat solid lower substrate electrode patterns are formed on the lower substrate so that the lens is formed through alignment of the liquid crystal molecules along the electric field generated by applying a voltage to both the upper and lower substrate electrode patterns.

Japanese Unexamined Patent Application Publication (Translation of PCT Application) No. 2009-520231 discloses a liquid crystal lens that uses the electric field generated by a longitudinal electric field between the upper substrate electrode pattern and the lower substrate electrode pattern. Those upper and the lower substrate electrode patterns on the upper and lower substrates are similar, but an angle of 90° is formed therebetween through turning with each other. This makes it possible to make the lens to turn at 90° through the method of applying the voltage to the upper and lower substrate electrode patterns. The three-dimensional display may be performed both in horizontal and vertical modes.

FIGS. 10 to 13 schematically show a liquid crystal lens 10 and a 3D display using the liquid crystal lens 10. The terms "2D display" and "3D display" herein refer to the "two-dimensional display" and the "three-dimensional display". The liquid crystal lens 10 has the same structure as the liquid crystal display element, which interposes the liquid crystal between two substrates which form electrodes. However, unlike the liquid crystal display for displaying purpose, it is not intended to be used for the control of polarization direction, and accordingly, no polarizer is used.

FIG. 10 schematically shows the electrodes formed on the two substrates that interpose the liquid crystal. The electrode on the lower substrate 30 has a transversely long rectangular pattern as indicated by a solid line, and the electrode on the upper substrate 20 has a rectangular pattern as indicated by a dashed line. Rectangular boxes A and B denote electrode terminals that externally apply the voltage. The line which connects the electrode terminal to the electrode on the aforementioned substrate denotes a wiring. The electrode connected to the electrode terminal A may be designated as an electrode A, and the electrode connected to the electrode terminal B may be designated as an electrode B. Basically, each pattern on the upper and lower substrates is not limited, and those patterns may be reversed with respect to the upper and lower substrates. Since transmission of light is required, the transparent electrode such as ITO is used for forming at least the electrode as shown by the dashed line, which entirely covers the display portion.

Arrow P1 shown in FIG. 10 denotes a rubbing direction on the lower substrate, and arrow P2 denotes a rubbing direction on the upper substrates. The interposed liquid crystal is aligned to have a part at a longer axis side directed toward the arrow direction when no voltage is applied. FIG. 11 is a sectional view taken along line Y-Y of FIG. 10. The electrodes on the lower substrate 30 are set so that two pixels of a liquid crystal display panel 100 below the liquid crystal lens 10 are arranged between two electrodes. Actually, a pitch of the two pixels is not the same as the pitch of the electrodes. Those pitches are appropriately designed in accordance with an assumed viewing position.

FIG. 11 illustrates a state where each voltage applied to the upper and lower electrodes is set to be the same, that is, no voltage is applied to the liquid crystal. In other words, the liquid crystal lens 10 is in an off-state. In this state, the liquid crystal is entirely in an alignment direction regulated through rubbing. The liquid crystal lens 10 as an optically uniform medium with respect to the transmitted light performs no action, while directly outputting the 2D image on the liquid crystal display panel 100.

FIG. 12 illustrates a state where the voltage is applied to the upper and lower electrodes of the liquid crystal lens 10 so as to change the alignment direction of the liquid crystal, that is, the liquid crystal lens 10 is in an on-state. Like the liquid crystal display panel 100 in a normal state, AC voltage is applied for preventing deterioration in the liquid crystal. The electrode on the upper substrate 20 is flat solid, and the lower electrodes locally exist. Therefore, the electric field applied to the liquid crystal is not uniform in the longitudinal and transverse directions. Along the radial (parabolic) electric field toward the upper solid electrode from the locally positioned lower electrodes, the liquid crystal molecules are also radially aligned as shown in the drawing.

A liquid crystal molecule 50 exhibits a birefringent property. Polarization light of transmitted light has the component in the longitudinal direction (longer axis direction) of the molecule brought into extraordinary light with high refractive index. The component orthogonal to the one in the longitudinal direction of the molecule is brought into ordinary light with lower refractive index than that of the extraordinary light. The intervening angle may be obtained through resolution into the extraordinary light component and the ordinary light component in the same manner as vector resolution. The birefringent property aligns the liquid crystal as shown in FIG. 12.

If a polarization direction 40 of the incident light, that is, the light emitted from the liquid crystal display panel 100 is substantially parallel to the rubbing direction on the liquid crystal lens 10, the ratio between the portion with high refractive index (extraordinary light) and the portion with low refractive index upon passage of the incident light through the liquid crystal lens 10 varies by location. As FIGS. 10 and 11 show, the longer axis direction of the liquid crystal molecule 50 is in line with the rubbing direction which determines an initial alignment of the liquid crystal.

Referring to FIG. 12, a dashed line representative of an interface of a convex lens 11 schematically shows the interface between the portion with high refractive index and the portion with low refractive index. The same effect as the one derived from the convex lens is obtained in the liquid crystal. When two pixels of the liquid crystal display panel 100 are provided under the effect of the convex lens as shown in FIG. 12, light rays from a first pixel 200 change the paths mainly to the right side, and light rays from a second pixel 300 change the paths mainly to the left side. Referring to FIG. 12, each of codes "r", "g" and "b" of the first pixel 200 and the second pixel 300 denotes a "red sub-pixel", a "green sub-pixel" and a "blue sub-pixel", respectively, common to all the pixels. In the condition where the liquid crystal lens 10 and the liquid crystal display panel 100 are appropriately designed so that signals for a right eye and a left eye are displayed on the first pixel 200 and the second pixel 300, the light from the first pixel 200 and the light from the second pixel 300 may be guided to the right eye and the left eye of a viewer, respectively. This allows the viewer to recognize the 3D image.

FIG. 13 is a plan view representing a relationship between pixels of the liquid crystal display panel 100 for right and left eyes and low electrode patterns 31 of the liquid crystal lens. Referring to the liquid crystal display panel 100 in FIG. 13, the pixels for the right eye are designated as A1 to A4, and those for the left eye are designated as B1 to B4.

FIG. 14 illustrates the liquid crystal lens 10 with respect to the pattern configuration of the lower substrate electrode patterns 31 and the rubbing direction. Referring to FIG. 14, both the rubbing direction P1 on the upper substrate and the rubbing direction P2 on the lower direction are transverse. The polarization direction 40 of emission from the liquid crystal display panel is transverse as well. FIG. 15 is a sectional view of the liquid crystal lens 10 shown in FIG. 14 in a state where no voltage is applied between the upper substrate 20 and the lower substrate 30. FIG. 16 is a sectional view of the liquid crystal lens 10 in the state where the voltage is applied between the upper substrate 20 and the lower substrate 30.

A pair of polarized sunglasses as shown in FIG. 17 may be used when fishing on the seashore, for example, for preventing difficulty in viewing scenery owing to incidence of light reflected from the water surface. The transmission polarization axis of the polarized sunglasses is in a vertical direction as shown in FIG. 17. However, the emission polarization axis of the liquid crystal lens as shown in FIGS. 14 to 16 is transverse. When using the polarized sunglasses, the light ray that has passed through the liquid crystal lens may fail to pass through the polarized sunglasses. Accordingly, the viewer cannot see the image on the liquid crystal display device provided with the liquid crystal lens.

The polarization axis of the light ray that has passed through the liquid crystal lens as shown in FIGS. 14 to 16 is in an arrowed direction B shown in FIG. 18. Since the transmission polarization axis of the polarized sunglasses is vertical, the light that has passed through the liquid crystal lens shown in FIGS. 14 to 16 cannot be visually recognized through the polarized sunglasses. If the polarization axis of the light which has passed through the liquid crystal lens is in an arrowed direction A, the emitted light is allowed to pass through the polarized sunglasses.

FIGS. 19 to 21 show the liquid crystal lens having the polarization axis of the light emitted from the liquid crystal lens vertically directed. FIG. 19 illustrates the lower substrate electrode patterns 31 and the rubbing direction on the liquid crystal lens 10. Referring to FIG. 19, the rubbing direction P1 on the lower substrate and the rubbing direction P2 on the upper direction are vertical. The polarization axis of the light emitted from the liquid crystal display panel is also in the vertical direction. Accordingly, the light that has passed through the liquid crystal lens 10 as shown in FIGS. 19 to 21 may be visually recognized through the polarized sunglasses.

FIG. 20 shows the state where no voltage is applied between the upper substrate 20 and the lower substrate 30 of the liquid crystal lens 10 shown in FIG. 19. FIG. 21 shows the state where the voltage is applied between those substrates. Referring to FIG. 20, since the liquid crystal molecules are not modulated, the light emitted from the liquid crystal display panel 100 directly passes through the liquid crystal lens 10. Referring to FIG. 21, the voltage is applied between the upper substrate 20 and the lower substrate 30 to form the liquid crystal lens, which enables the 3D display. The polarization axis of the light passing through the liquid crystal lens 10 is in the vertical direction, which may be visually recognized through the polarized sunglasses.

Referring to FIG. 19, it is necessary to make a 90° turn of the liquid crystal molecules and align them along the electric field so as to form the convex lens using the liquid crystal molecules. The experimental results of the inventors have clarified the difficulty in forming the liquid crystal lens which enables the clear 3D display. This is mainly considered to be caused by the absence of regulation in the turning direction when making the 90° turn of the liquid crystal molecules. This may generate the region with different alignment such as inverse turn, that is, domain, thus disrupting the interface between the ordinary light and the extraordinary light.

SUMMARY OF THE INVENTION

The present invention provides the liquid crystal display device with the liquid crystal lens that enables 3D display, which allows clear visualization of the image from the liquid crystal display device using the polarized sunglasses.

Meanwhile, on demand from recent application of the liquid crystal display device, the function capable of selectively displaying in the portrait mode (vertical display) and the landscape mode (horizontal display) has been added like the mobile phone. To cope with the desired usage, the 3D panel is required to have the function for selecting the display between the vertical and the horizontal modes.

FIG. 22 shows an example of generally employed art which allows the liquid crystal lens 10 to select the display in the vertical and horizontal modes. Like the case as shown in FIG. 10, the solid line indicates the lower substrate electrode patterns 31, and the dashed line indicates the upper substrate electrode patterns 21. Each of the upper substrate 20 and the lower substrate 30 is formed of narrow electrodes each as the local electrode, and wide electrodes so as to be solid corresponding to the narrow electrodes on the counter substrate. Codes "A", "B", "C" and "D" refer to the terminal electrodes for application of voltage to the respective electrode patterns, and also refer to corresponding electrodes.

FIGS. 23 and 24 are sectional views each showing formation of the transversely extending cylindrical liquid crystal lens 10 shown in FIG. 22. The consequence substantially the same as the one described referring to FIGS. 11 and 12 occurs so as to provide the function of the liquid crystal lens 10. The state shown in FIGS. 23 and 24 is different from the one shown in FIGS. 11 and 12 in that a transverse electric field is generated between the electrodes A and C as indicated by FIG. 24. This transverse electric field is substantially in the same direction as the rubbing direction, thus giving no fatal impact on the liquid crystal alignment and the lens effect.

FIGS. 25 and 26 are sectional views each taken along line X-X of FIG. 22. FIG. 25 shows the state where no voltage is applied to the liquid crystal for 2D display. The liquid crystal molecules 50 each shown as a circle in the drawing indicates that the longer axis is longitudinally directed with respect to the upper electrode, that is, in the vertical direction with respect to a plane of the drawing. FIG. 26 shows the state where the voltage is applied so that the electric field is generated between the electrode B and the other electrodes A, C and D on the upper substrate 20. Like FIG. 12 or FIG. 24, the liquid crystal is aligned again along the radial electric field directed toward C from B so as to form a downward convex lens shape. The transverse electric field is simultaneously generated between the electrodes B and D on the upper substrate 20. The liquid crystal is also aligned again along this electric field.

In the course of observation that the transverse electric field not only disrupts the configuration of the liquid crystal lens 10 but also causes the lens effect to disappear, taking a long time (owing to change in the liquid crystal domain) as experimental results, it is found to be difficult to put the above-described selection of the display between the vertical and horizontal modes into practical application.

The present invention provides the liquid crystal display device with the liquid crystal lens 10 that enables the 3D display, which is capable of selecting the display between the vertical and horizontal modes.

Specifically, the present invention provides a liquid crystal display device having a liquid crystal lens on a liquid crystal display panel.

(1) The liquid crystal display panel includes a first pixel that contains a red sub-pixel, a green sub-pixel and a blue sub-pixel, and a second pixel that contains a red sub-pixel, a green sub-pixel and a blue sub-pixel. The liquid crystal lens is formed by interposing a liquid crystal between a first substrate and a second substrate. The first substrate has a plurality of electrodes in stripes, which extend in a first direction, and are arranged at predetermined intervals in a second direction. The second substrate has a flat solid electrode. An initial alignment direction of liquid crystal molecules on the first substrate is in line with a polarization axis of light emitted from the liquid crystal display panel as the second direction at a right angle with the first direction. An initial alignment direction of the liquid crystal molecules on the second substrate is set at an angle within a range of 90°±5° with respect to the initial alignment direction of the liquid crystal molecules on the first substrate.

(2) The present invention provides a liquid crystal display device having a liquid crystal lens on a liquid crystal display panel. The liquid crystal display panel includes a first pixel that contains a red sub-pixel, a green sub-pixel and a blue sub-pixel, and a second pixel that contains a red sub-pixel, a green sub-pixel and a blue sub-pixel. The liquid crystal lens is formed by interposing a liquid crystal between a first substrate and a second substrate. The first substrate has a plurality of electrodes in stripes, which extend in a first direction, and are arranged at predetermined intervals in a second direction. The second substrate has a flat solid electrode. An initial alignment direction of liquid crystal molecules on the first substrate is in line with a polarization axis of light emitted from the liquid crystal display panel as the second direction at a right angle with the first direction. An initial alignment direction of the liquid crystal molecules on the second substrate is set at an angle within a range from 45° to 90° with respect to the initial alignment direction of the liquid crystal molecules on the first substrate.

(3) The present invention provides a liquid crystal display device having a liquid crystal lens on a liquid crystal display panel. The liquid crystal display panel includes pixels that contain red sub-pixels, green sub-pixels, and blue sub-pixels, which are arranged in a first direction at first intervals, and are arranged in a second direction at a right angle with the first direction at second intervals. The liquid crystal lens is formed by interposing a liquid crystal between a first substrate and a second substrate. The first substrate includes a plurality of first narrow electrodes in stripes, extending in the first direction, and arranged in the second direction at intervals each corresponding to a value twice as large as the second interval, and second wide electrodes extend in the first direction at predetermined intervals between the first electrodes. The second substrate includes third narrow electrodes in stripes and fourth wide electrodes in stripes alternately arranged, extending in the second direction, while being arranged in the first direction at predetermined intervals, and the third electrodes are arranged in the first direction at an interval corresponding to a value twice as large as the first interval. An initial alignment direction of the liquid crystal molecules on the first substrate is set at the second direction, and an initial alignment direction of the liquid crystal molecules on the second substrate is set at the first direction. A different voltage is allowed to be applied to each of the first, the second, the third and the fourth electrodes.

The present invention allows the liquid crystal display device to visualize the 3D image regardless of using the polarized sunglasses, and further allows the selective 3D display between vertical and horizontal modes.

DESCRIPTION OF THE PREFERRED EXAMPLES

The present invention will be described in detail in reference to the examples. In the following examples, the term "rubbing direction" is used to refer to the direction of the liquid crystal molecules for initial alignment. The present invention may be applied to the optical alignment process for the initial alignment of the liquid crystal.

Example 1

Figure 1:
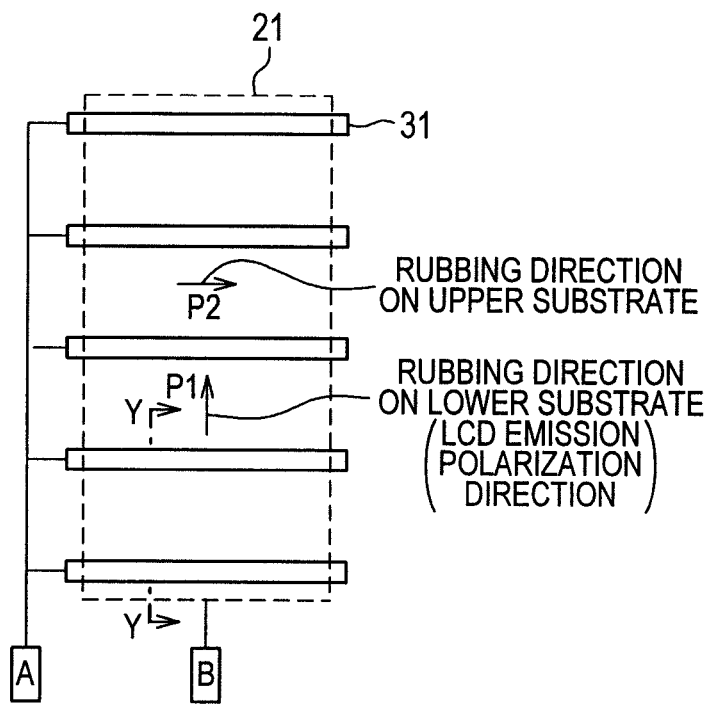
FIG. 1 is a plan view showing an electrode structure of a liquid crystal lens according to Example 1.
Figure 10:
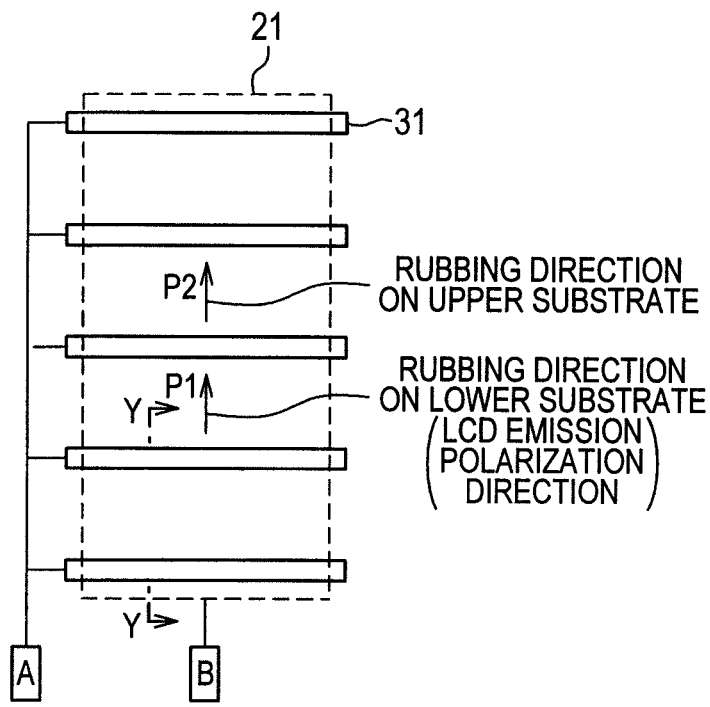
FIG. 10 is a plan view showing an electrode structure of a generally employed liquid crystal lens.

FIG. 1 is a plan view illustrating the electrode structure of the liquid crystal lens 10 according to Example 1, and the rubbing directions on the upper substrate 20 and the lower substrate 30. The electrode structure shown in FIG. 1 is the same as the electrode structure shown in FIG. 10, and the explanation thereof, thus will be omitted. The structure shown in FIG. 1 is different from the one shown in FIG. 10 in the rubbing direction on the upper substrate 20. The rubbing direction on the lower substrate 30 is vertical with respect to the extending direction of the lower substrate electrode pattern 31 in the same manner as the structure shown in FIG. 10. The rubbing direction on the upper substrate 20 is the same as the extending direction of the lower substrate electrode pattern 31. Therefore, the initial alignment of the liquid crystal molecules interposed between the upper substrate 20 and the lower substrate 30 is twisted.

Figure 2:
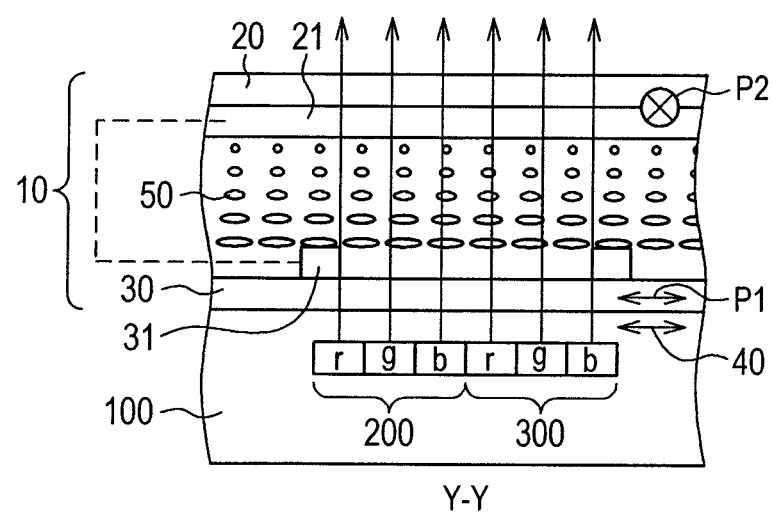
FIG. 2 is a sectional view taken along line Y-Y of FIG. 1 when no voltage is applied.
Figure 11:
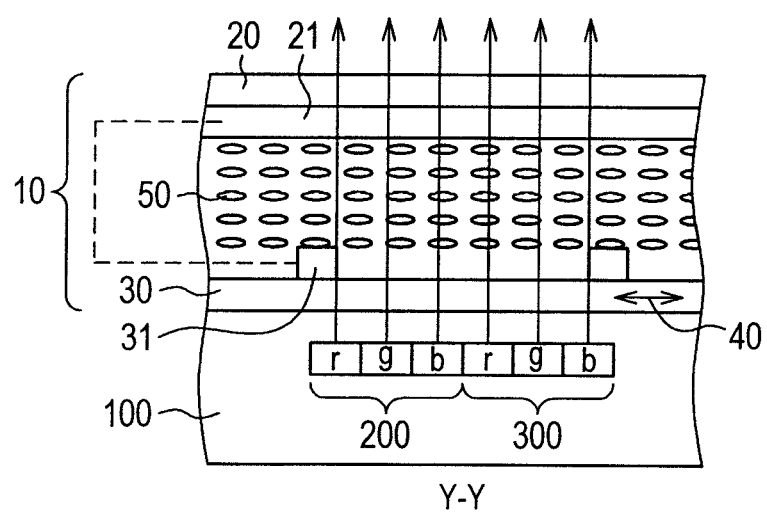
FIG. 11 is a sectional view taken along line Y-Y of FIG. 10 when no voltage is applied.
Figure 12:
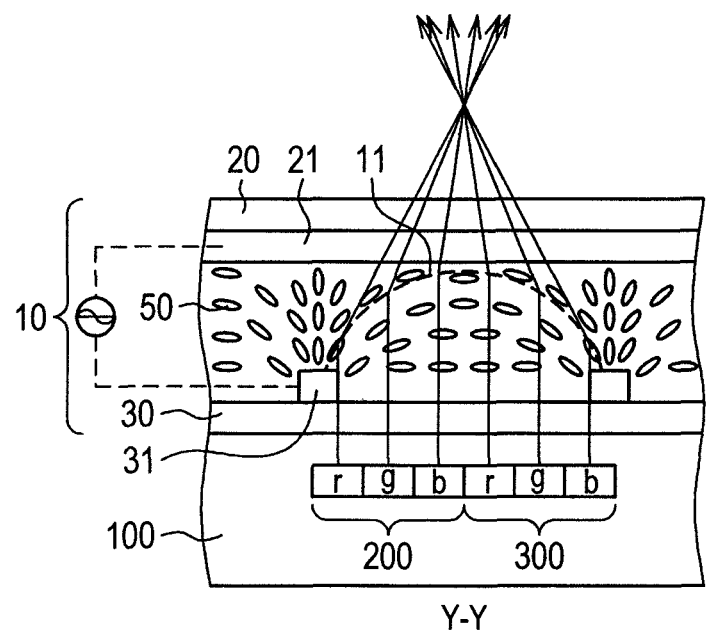
FIG. 12 is a sectional view taken along line Y-Y of FIG. 10 when the voltage is applied.
Figure 13:
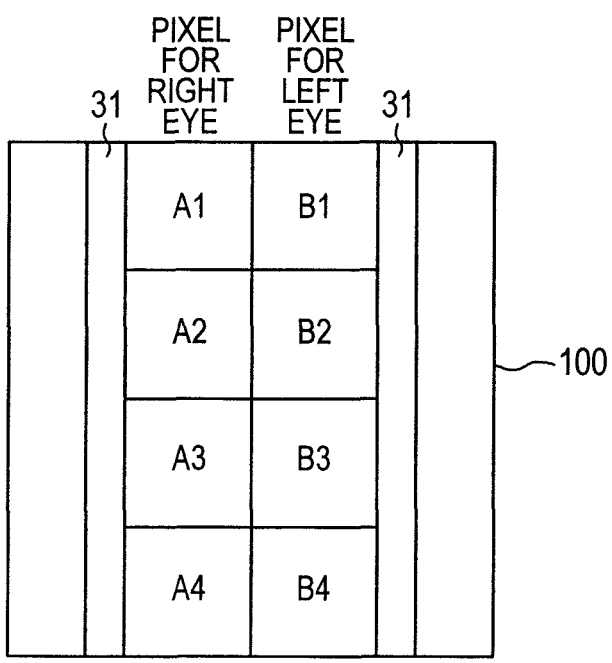
FIG. 13 is a plan view schematically representing a relationship between pixels of the liquid crystal display panel and the lower substrate electrode patterns of the liquid crystal lens.
Figure 14:
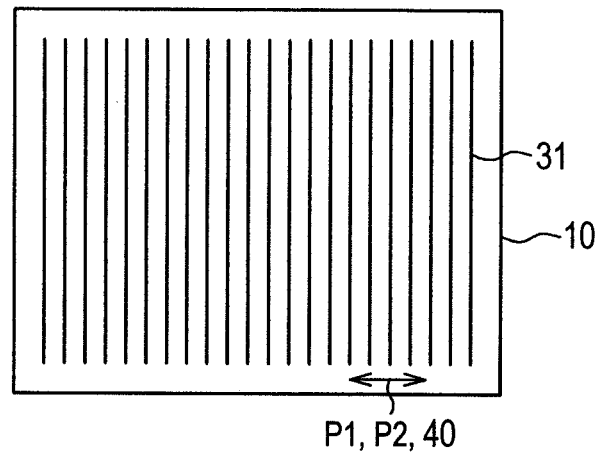
FIG. 14 is a plan view of the liquid crystal lens when the rubbing direction is set to be horizontal.
Figure 15:
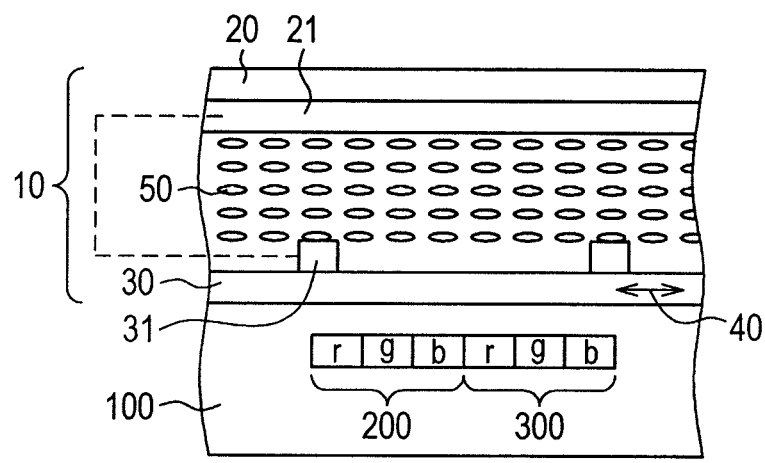
FIG. 15 is a sectional view of the liquid crystal lens shown in FIG. 14 when no voltage is applied.
Figure 16:
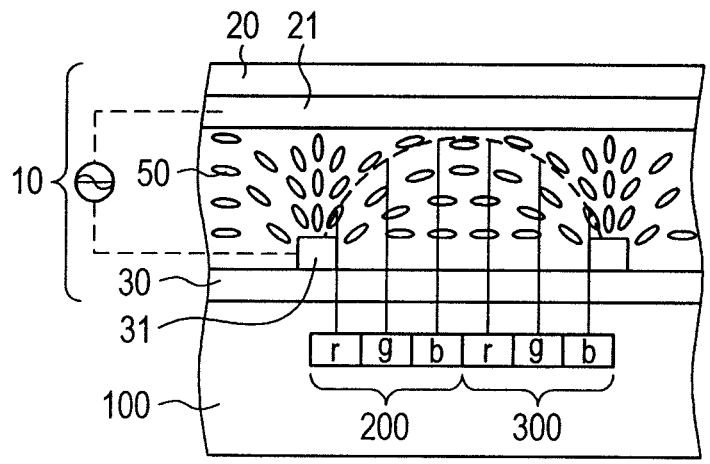
FIG. 16 is a sectional view of the liquid crystal lens shown in FIG. 14 when the voltage is applied.
Figure 17:
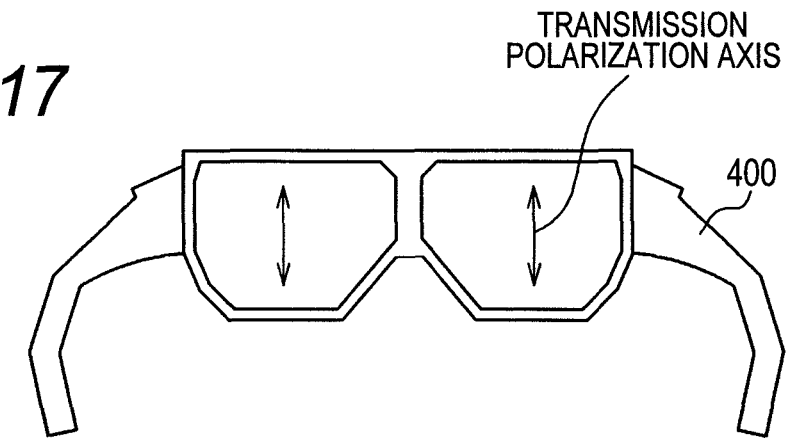
FIG. 17 is a view showing a transmission polarization axis of polarized sunglasses.
Figure 18:
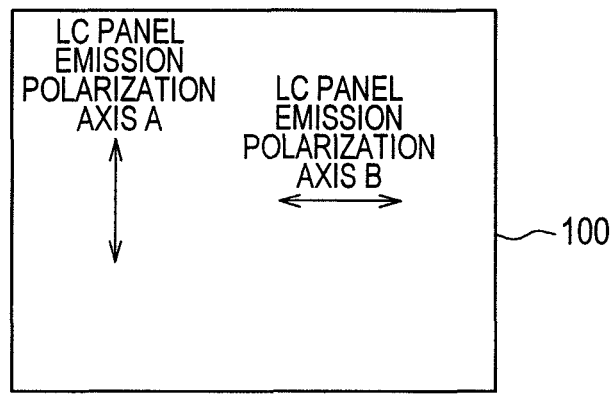
FIG. 18 represents an example of the polarization axis of light emission on the liquid crystal display panel.
Figure 19:
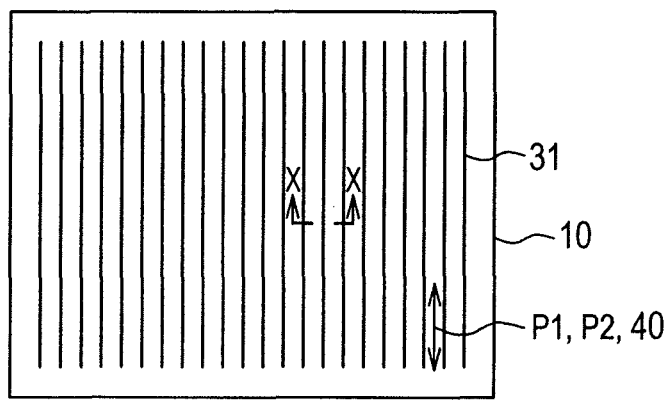
FIG. 19 is a plan view of the liquid crystal lens when the rubbing direction is set to be vertical.
Figure 20:
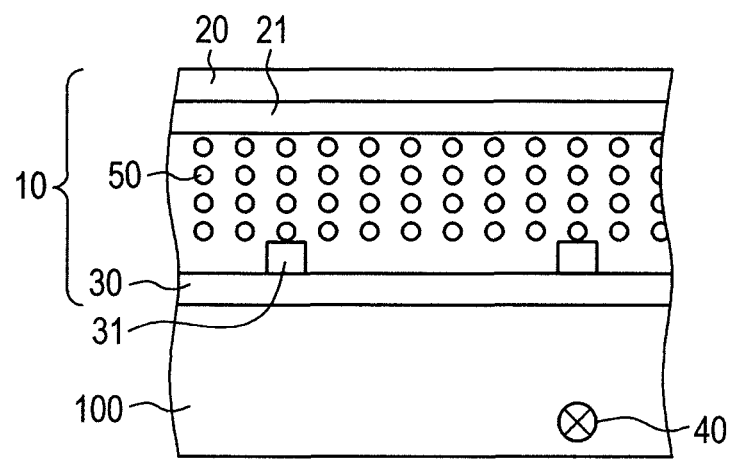
FIG. 20 is a sectional view taken along line X-X of FIG. 19 when no voltage is applied.
Figure 21:
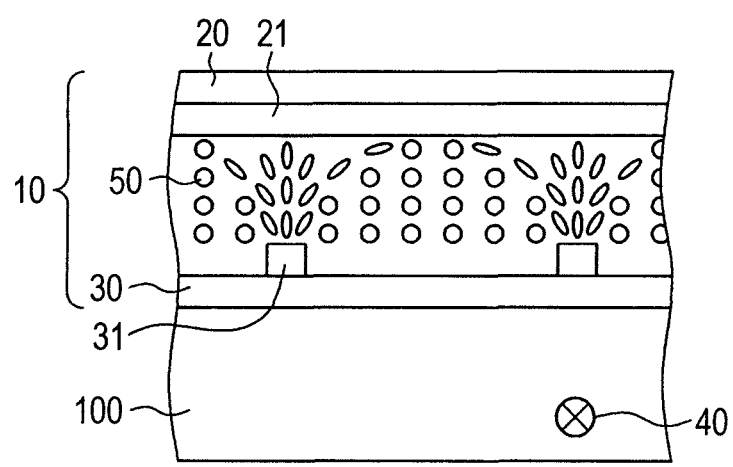
FIG. 21 is a sectional view taken along line X-X of FIG. 19 when the voltage is applied.
Figure 22:
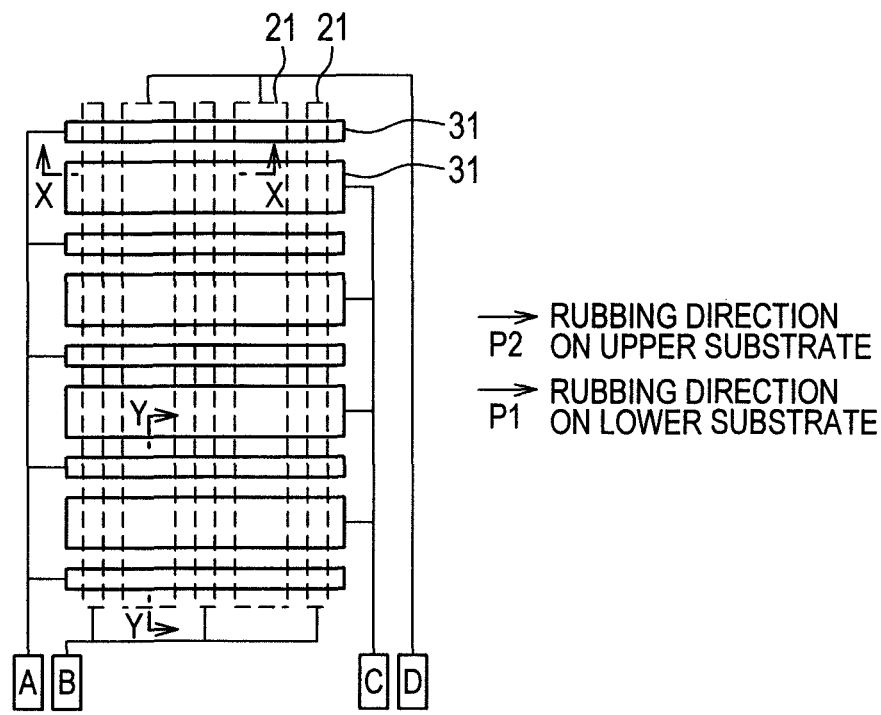
FIG. 22 is a plan view representing an electrode structure of the generally employed liquid crystal lens, capable of selecting the display between vertical mode and horizontal mode.
Figure 23:
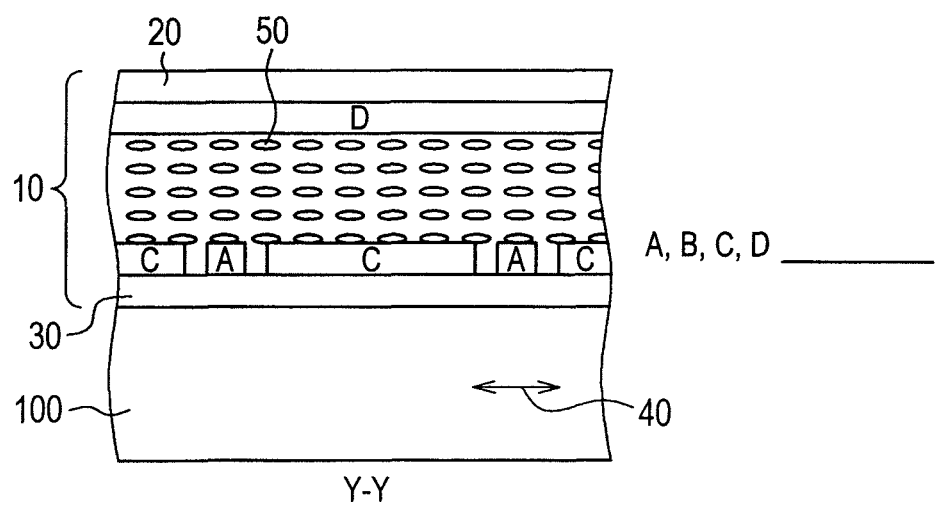
FIG. 23 is a sectional view taken along line Y-Y of FIG. 22 when no voltage is applied.
Figure 24:
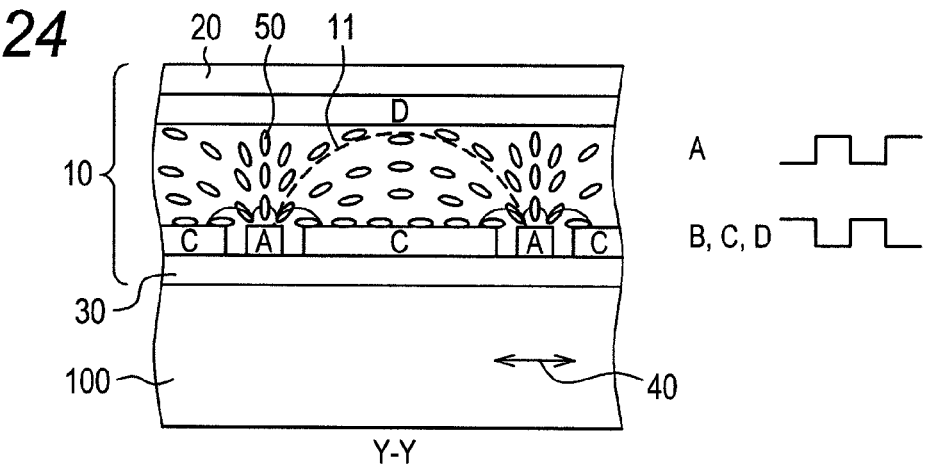
FIG. 24 is a sectional view taken along line Y-Y of FIG. 22 when the voltage is applied.
Figure 25:
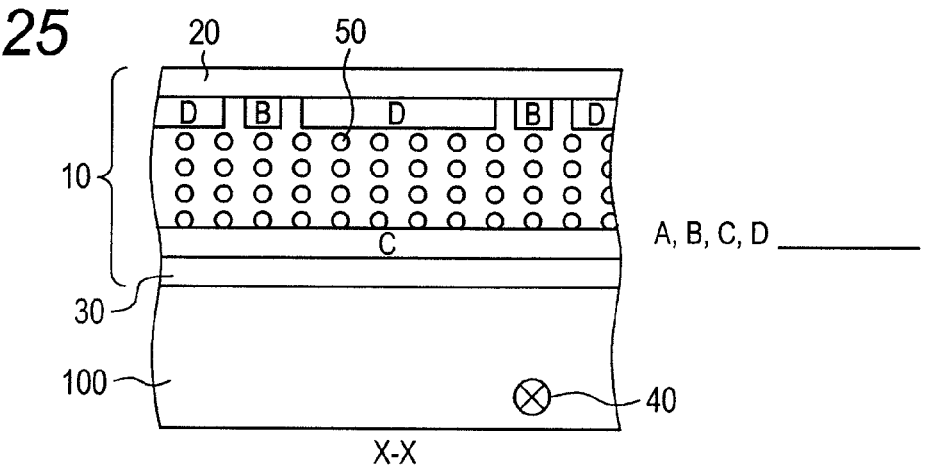
FIG. 25 is a sectional view taken along line X-X of FIG. 22 when no voltage is applied.

FIG. 2 is a sectional view of the liquid crystal lens 10 shown in FIG. 1 taken along line Y-Y. The structure as illustrated in FIG. 2 is the same as the structure shown in FIG. 11 except the rubbing direction on the upper substrate 20 and the initial alignment of the liquid crystal molecules 50, and detailed explanations of the structure will be omitted. Referring to FIG. 2, the polarization axis of the light emitted from the liquid crystal display panel 100 is in the same transverse direction as the rubbing direction on the lower substrate 30 of the liquid crystal lens 10. Meanwhile, the rubbing direction on the upper substrate 20 is at a right angle with the rubbing direction on the lower substrate 30. Then the liquid crystal molecules 50 are aligned parallel to the plane of the drawing around the lower substrate 30, and in the direction vertical to the plane of the drawing around the upper substrate 20. The aforementioned structure is of Twisted Nematic (TN) type. FIG. 2 represents the state of the aforementioned structure where no voltage is applied between the upper substrate 20 and the lower substrate 30.

Figure 3:
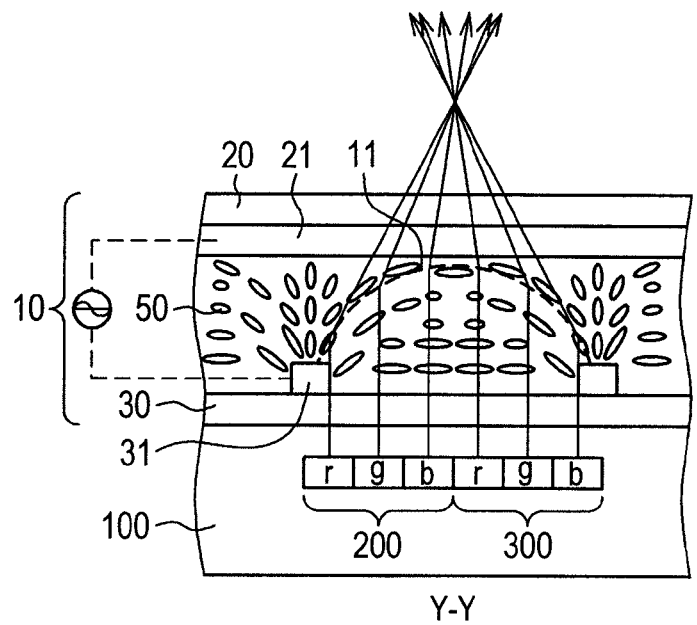
FIG. 3 is a sectional view taken along line Y-Y of FIG. 1 when the voltage is applied.

FIG. 3 represents the same structure shown in FIG. 2 in the state where the voltage is applied between the upper substrate 20 and the lower substrate 30 to form the liquid crystal lens 10 like the convex lens. The liquid crystal lens 10 extends vertically with respect to the plane of the drawing to form a cylindrical lens. The application of the aforementioned lens for the 3D display allows provision of sufficiently practical images although the resultant brightness is lowered to a certain extent. This is thought to be caused by the residual TN effect, around the center of the lens 10, having the rotary polarization component left to a degree that keeps the viewer nearly imperceptible to the brightness deterioration.

According to the example shown in FIGS. 1 to 3, the change axis of polarization from the liquid crystal lens 10 may be brought to be in line with the polarization axis of polarized sunglasses 400. The image on the liquid crystal display device may be recognized even when the polarized sunglasses 400 are used.

Example 2

Figure 4:
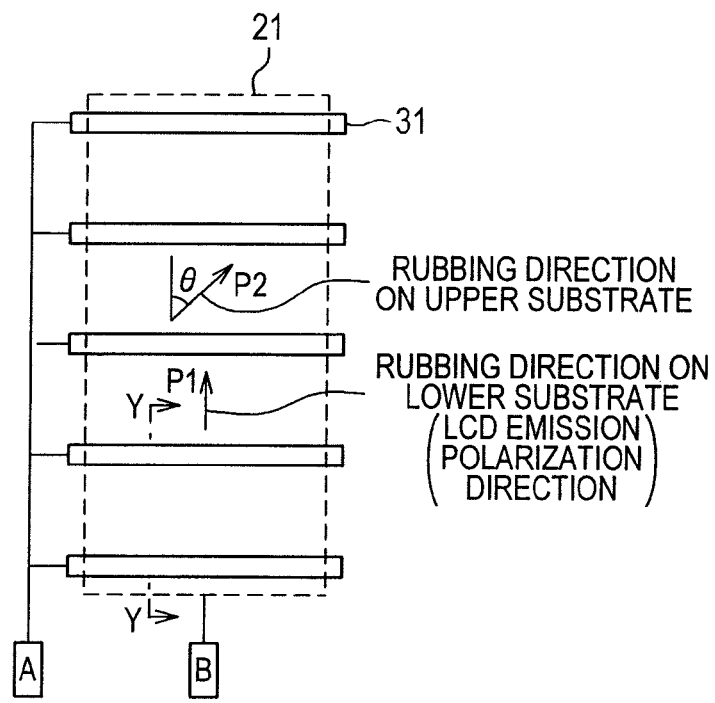
FIG. 4 is a plan view showing an electrode structure of a liquid crystal lens according to Example 2.

FIG. 4 is a plan view of Example 2 according to the present invention, which is the same as Example 1 shown in FIG. 1 except the rubbing direction P2 on the upper substrate 20. Referring to FIG. 4, the rubbing direction P2 on the upper substrate 20 is tilted at a predetermined angle θ with respect to the rubbing direction P1 on the lower substrate 30.

The aforementioned structure allows the viewer to visually recognize the 3D image of the liquid crystal lens 10 using the polarized sunglasses 400. If the predetermined angle θ is equal to 90° exactly, the viewer is capable of visually recognizing the brightest 3D image. However, the viewer is also capable of visually recognizing the 3D image with the predetermined brightness even when the angle θ is not 90°. That is, application of the polarized sunglasses 400 may avoid the case where the image is completely invisible like the related art.

In the structure of this example having the angle θ set to 45°, the 2D image on the screen in vertical mode or horizontal mode may be seen accompanied with selection of the display between the vertical and horizontal modes.

Example 3

On demand from recent application of the liquid crystal display device, the function capable of selectively displaying in the portrait mode (vertical display) and the landscape mode (horizontal display) has been added, like the mobile phone. To cope with the application, the 3D panel is required to have the function for selecting the display between the vertical and horizontal modes. The generally employed liquid crystal lens structure capable of selectively displaying the 3D images and its problem have been described referring to FIGS. 22 and 23 to 26 as sectional views thereof.

Figure 26:
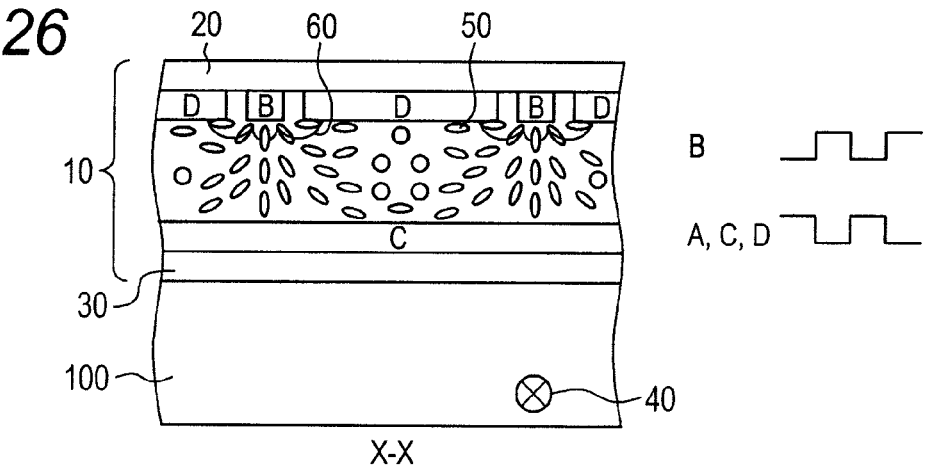
FIG. 26 is a sectional view taken along line X-X of FIG. 22 when the voltage is applied.

The most notable problem of the related art as shown in FIG. 26 is that the transverse electric field is generated between the electrodes B and D on the upper substrate, and the liquid crystal is aligned again along the electric field. The transverse electric field not only disrupts the configuration of the liquid crystal lens 10 but also causes the lens effect to disappear over a long time as the liquid crystal domain changes.

Figure 5:
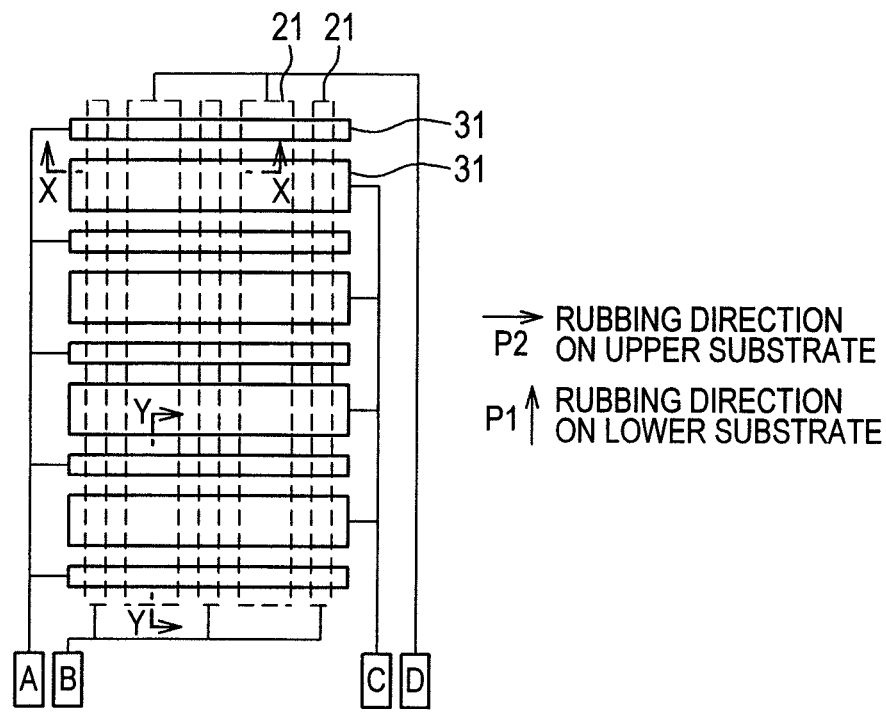
FIG. 5 is a plan view showing an electrode structure of a liquid crystal lens according to Example 3.

FIG. 5 is a plan view illustrating an electrode structure according to the present invention to solve the aforementioned problem. The electrode structure shown in FIG. 5 is the same as the one described referring to FIG. 22. That is, the solid line represents the electrode patterns 31 on the lower substrate 30, and the dashed line represents the electrode patterns 21 on the upper substrate 20. FIG. 5 is different from FIG. 22 in the rubbing direction on the upper substrate 20, which is at a right angle with the rubbing direction on the lower substrate 30. The liquid crystal interposed between the upper substrate 20 and the lower substrate 30 is brought into the twisted structure. Optimally, the angle formed by the rubbing direction P1 on the lower substrate 30 and the rubbing direction P2 on the upper substrate 20 forms a right angle. However, sufficient operation may be obtained so far as the angle is within the range of 90°±5°.

Figure 6:
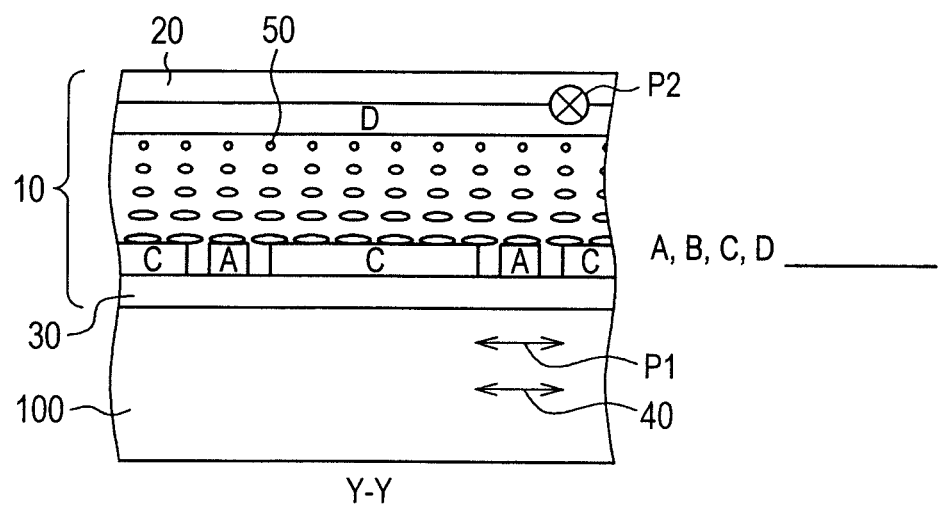
FIG. 6 is a sectional view taken along line Y-Y of FIG. 5 when no voltage is applied.

FIG. 6 is a sectional view taken along line Y-Y of FIG. 5 when no voltage is applied between the upper substrate 20 and the lower substrate 30. Referring to FIG. 6, the lower substrate 30 is subjected to rubbing in the direction parallel to the plane of the drawing, and the upper substrate 20 is subjected to rubbing in the direction vertical to the plane of the drawing. The incident light to the liquid crystal lens from the liquid crystal display panel emits from the upper substrate while changing the direction of the polarization axis at 90°.

Figure 7:
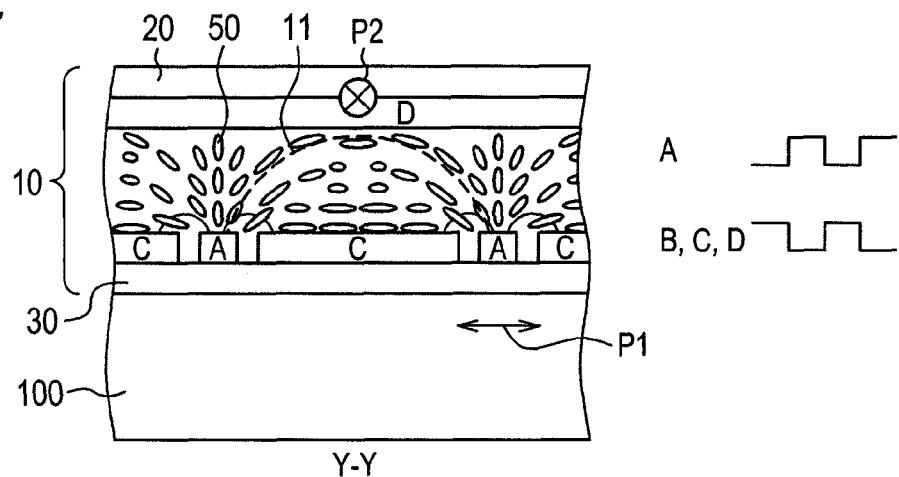
FIG. 7 is a sectional view taken along line Y-Y of FIG. 5 when the voltage is applied.

FIG. 7 is a sectional view taken along line Y-Y of FIG. 5 when the voltage is applied between the upper substrate 20 and the lower substrate 30. Referring to FIG. 7, each rubbing direction on the upper substrate 20 and the lower substrate 30 is the same as the one described referring to FIG. 6. Referring to FIG. 7, the voltage is applied between the electrode D on the upper substrate 20 and the electrodes A, C on the lower substrate 30. The liquid crystal molecules are aligned along the electric force line generated under the voltage to form the convex lens. The aforementioned action is similar to the case described according to Example 1 referring to FIGS. 2 and 3.

Figure 8:
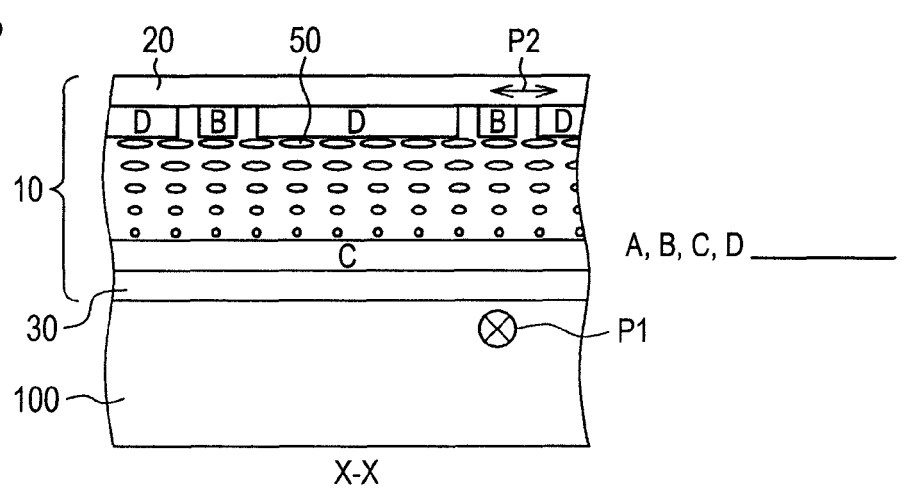
FIG. 8 is a sectional view taken along line X-X of FIG. 5 when no voltage is applied.

FIG. 8 is a sectional view taken along line X-X of FIG. 5 when no voltage is applied between the upper substrate 20 and the lower substrate 30. Referring to FIG. 8, the rubbing direction on the upper substrate 20 is horizontal with respect to the plane of the drawing, and the rubbing direction on the lower substrate is vertical to the plane of the drawing. The light emitted from the liquid crystal display panel 100 is emitted from the upper substrate while changing the direction of the polarization axis at 90°. The views shown in FIGS. 8 and 6 have an upside-down positional relationship.

Figure 9:
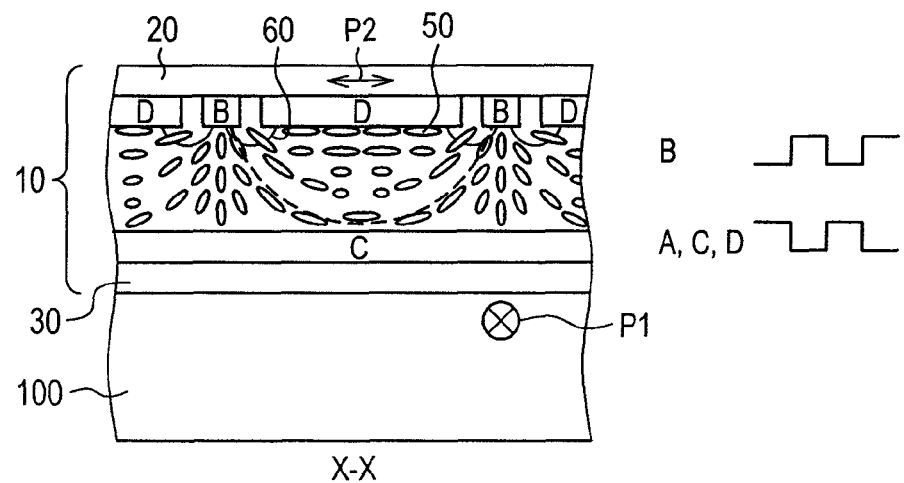
FIG. 9 is a sectional view taken along line X-X of FIG. 5 when the voltage is applied.

FIG. 9 is a sectional view taken along line X-X of FIG. 5 when the voltage is applied between the upper substrate 20 and the lower substrate 30. The rubbing directions on the upper substrate 20 and the lower substrate 30 are similar to the case described referring to FIG. 8. Referring to FIG. 9, the voltage is applied between the electrodes D, B on the upper substrate 20 and the electrode C on the lower substrate 30. The liquid crystal molecules 50 are aligned along the electric force line under the voltage to form the convex lens. The convex lens is directed downward. The aforementioned action is essentially the same as the action of Example 1 described referring to FIGS. 2 and 3. The views shown in FIGS. 7 and 9 have the upside-down positional relationship. The structure shown in FIG. 9 is capable of stably displaying the 3D images as well.

The liquid crystal display device capable of selecting the display between vertical and horizontal modes is allowed to stably perform the 3D display. The rubbing direction on the upper substrate 20 of the liquid crystal lens 10 is set to be at a right angle with the ground so as to visually recognize the display of the liquid crystal display device even when the polarized sunglasses 400 are used.

What is claimed is:

1. A liquid crystal display device having a liquid crystal lens on a liquid crystal display panel,
wherein the liquid crystal display panel includes a first pixel that contains a red sub-pixel, a green sub-pixel and a blue sub-pixel, and a second pixel that contains a red sub-pixel, a green sub-pixel and a blue sub-pixel;
the liquid crystal lens is formed by interposing a liquid crystal between a first substrate and a second substrate, and includes a plurality of lenses;
the first substrate has a plurality of electrodes in stripes on a same layer, which extend in a first direction, and are arranged at predetermined intervals in a second direction which is perpendicular to the first direction;
the second substrate has a flat solid electrode;
each of the plurality of lenses is located between each of two of the plurality of electrodes in stripes when a voltage is applied to the two electrodes, the two electrodes being adjacent to each other, the voltage being different from a voltage applied to the flat solid electrode,
a polarizing direction of an emitting light from the liquid crystal display panel is in the second direction, and the emitting light is incident to the first substrate;
a first initial alignment direction of liquid crystal molecules on the first substrate is in the second direction, the first initial alignment direction being parallel to a main surface of the first substrate; and
a second initial alignment direction of the liquid crystal molecules on the second substrate is set at an angle within a range of 90°±5° with respect to the first initial alignment direction of the liquid crystal molecules on the first substrate in a planar view, the second initial alignment direction being parallel to a main surface of the second substrate,
wherein the liquid crystal lens is formed by a Twisted Nematic type liquid crystal, and
wherein the first pixel and the second pixel are arranged in the second direction, and located between each of two of the electrodes in stripes.

2. The liquid crystal display device according to claim 1, wherein an angle of 90° is formed between the initial alignment direction of the liquid crystal molecules on the second substrate and the initial alignment direction of the liquid crystal molecules on the first substrate.

3. A liquid crystal display device having a liquid crystal lens on a liquid crystal display panel, wherein the liquid crystal display panel includes a first pixel that contains a red sub-pixel, a green sub-pixel and a blue sub-pixel, and a second pixel that contains a red sub-pixel, a green sub-pixel and a blue sub-pixel;

the liquid crystal lens is formed by interposing a liquid crystal between a first substrate and a second substrate, and includes a plurality of lenses;

the first substrate has a plurality of electrodes in stripes on a same layer which extend in a first direction, and are arranged at predetermined intervals in a second direction which is perpendicular to the first direction;

the second substrate has a flat solid electrode;

each of the plurality of lenses is located between each of two of the plurality of electrodes in stripes when a voltage is applied to the two electrodes, the two electrodes being adjacent to each other, the voltage being different from a voltage applied to the flat solid electrode, a polarizing direction of an emitting light from the liquid crystal display panel is in the second direction, and the emitting light is incident to the first substrate;

a first initial alignment direction of liquid crystal molecules on the first substrate is in the second direction, the first initial alignment direction being parallel to a main surface of the first substrate; and a second initial alignment direction of the liquid crystal molecules on the second substrate is set at an angle within a range from 45° to 90° with respect to the first initial alignment direction of the liquid crystal molecules on the first substrate in a planar view, the second initial alignment direction being parallel to a main surface of the second substrate, wherein the first pixel and the second pixel are arranged in the second direction, and located between each of two of the electrodes in stripes.

4. The liquid crystal displace device according to claim 3, wherein the first direction and the second direction are defined in a plane parallel to a surface of the first substrate.

5. A liquid crystal display device having a liquid crystal lens on a liquid crystal display panel, wherein the liquid crystal display panel includes pixels that contain red sub-pixels, green sub-pixels, and blue sub-pixels, which are arranged in a first direction at first intervals, and are arranged in a second direction at a right angle with the first direction at second intervals;

the liquid crystal lens is formed by interposing a liquid crystal between a first substrate and a second substrate, and forms first lenses and second lenses;

the first substrate includes a plurality of first electrodes in stripes, extending in the first direction, and arranged in the second direction at intervals each corresponding to a value twice as large as the second interval, and second electrodes extend in the first direction at predetermined intervals between the first electrodes, the first electrode and the second electrode are on a same layer;

each of the first electrodes has a first width;

each of the second electrodes has a second width which is wider than the first width;

the second substrate includes third electrodes in stripes and fourth electrodes in stripes alternately arranged, extending in the second direction, while being arranged in the first direction at predetermined intervals, and the third electrodes are arranged in the first direction at an interval corresponding to a value twice as large as the first interval the third electrode and the fourth electrode are on a same layer;

each of the third electrodes has a third width;

each of the fourth electrodes has a fourth width which is wider than the third width;

each of the first lenses is located between each of two of the first electrodes in stripes when a voltage is applied to the two first electrodes, the two first electrodes being adjacent to each other, the voltage being different from a voltage applied to the third and fourth electrodes, each of the second lenses is located between each of two of the third electrodes in stripes when a voltage is applied to the two third electrodes, the two electrodes being adjacent to each other, the voltage being different from a voltage applied to the first and second electrodes, a polarizing direction of a emitting light from the liquid crystal display panel is in the second direction, and the emitting light is incident to the first substrate, wherein the first liquid crystal lens and the first liquid crystal lens are formed by a Twisted Nematic type liquid crystal, a first initial alignment direction of the liquid crystal molecules on the first substrate is set at the second direction, the first initial alignment direction being parallel to a main surface of the first substrate, a second initial alignment direction of the liquid crystal molecules on the second substrate is set at the first direction the second initial alignment direction being parallel to a main surface of the second substrate; and a different voltage is allowed to be applied to each of the first, the second, the third and the fourth electrodes, wherein the first pixel and the second pixel are arranged in the second direction, and located between each of two of the electrodes in stripes.

6. The liquid crystal displace device according to claim 1, wherein the first direction and the second direction are defined in a plane parallel to a surface of the first substrate.

7. The liquid crystal displace device according to claim 5, wherein the first direction and the second direction are defined in a plane parallel to a surface of the first substrate.

* * * * *